US011932021B2

(12) United States Patent
Naratani et al.

(10) Patent No.: US 11,932,021 B2
(45) Date of Patent: Mar. 19, 2024

(54) RECORDING APPARATUS AND TANK

(71) Applicant: CANON KABUSHIKI KAISHA, Tokyo (JP)

(72) Inventors: Yusuke Naratani, Tokyo (JP); Koya Iwakura, Kanagawa (JP); Hideaki Matsumura, Kanagawa (JP); Tetsu Hamano, Tokyo (JP); Nobuhiro Toki, Kanagawa (JP); Daiju Takeda, Kanagawa (JP); Fumie Kameyama, Tokyo (JP); Koki Shimada, Kanagawa (JP); Shota Asada, Tokyo (JP); Ken Takenaga, Kanagawa (JP); Yusuke Tanaka, Kanagawa (JP); Yuta Araki, Chiba (JP); Taiji Maruyama, Kanagawa (JP); Atsushi Matsuyama, Kanagawa (JP); Kousuke Tanaka, Kanagawa (JP); Toshimitsu Takahashi, Kanagawa (JP); Nanae Uchinuno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/069,142

(22) Filed: Dec. 20, 2022

(65) Prior Publication Data

US 2023/0127454 A1 Apr. 27, 2023

Related U.S. Application Data

(63) Continuation of application No. 17/388,612, filed on Jul. 29, 2021, now Pat. No. 11,535,035.

(30) Foreign Application Priority Data

Jul. 31, 2020 (JP) ................................ 2020-130508

(51) Int. Cl.
*B41J 2/175* (2006.01)
*B41J 2/19* (2006.01)

(52) U.S. Cl.
CPC ....... *B41J 2/17506* (2013.01); *B41J 2/17503* (2013.01); *B41J 2/19* (2013.01)

(58) Field of Classification Search
CPC ................ B41J 2/17503; B41J 2/17505; B41J 2/17506; B41J 2/17513; B41J 2/1754;
(Continued)

(56) References Cited

U.S. PATENT DOCUMENTS 8,235,510 B2 * 8/2012 Lu ........................ B41J 2/17546 347/85
2004/0061748 A1 * 4/2004 Kuwabara ............ B41J 2/17509 347/85

(Continued)

FOREIGN PATENT DOCUMENTS

CN 102407674 A 4/2012
CN 102673127 A 9/2012

(Continued)

*Primary Examiner* — Anh T Vo
(74) *Attorney, Agent, or Firm* — Canon U.S.A., Inc. IP Division

(57) ABSTRACT

A recording apparatus includes a tank including a chamber configured to store liquid to be supplied to a recording head that ejects the liquid and a filling port from which the liquid is injected into the chamber, and an injection auxiliary member configured to assist injecting of the liquid into the chamber from the filling port, the injection auxiliary member including a first and a second flow channels each defined by a first or a second upper end portion that opens toward outside of the tank and a first or a second lower end portion that opens toward inside of the tank, wherein the second flow channel has an expansion portion arranged in a middle portion between the second upper end portion and the second lower end portion and configured to form a step to expand a cross-sectional area.

15 Claims, 11 Drawing Sheets

(58) Field of Classification Search

CPC ................ B41J 2/17553; B41J 2/17566; B41J 2/17573; B41J 2/19; B41J 29/02

See application file for complete search history.

(56) References Cited

U.S. PATENT DOCUMENTS

| | | | | |
|---|---|---|---|---|
| 2018/0272723 | A1* | 9/2018 | Shinada | B41J 2/17509 |
| 2020/0316949 | A1* | 10/2020 | Shimada | B41J 2/17509 |

FOREIGN PATENT DOCUMENTS

| | | | |
|---|---|---|---|
| CN | 203358051 | U | 12/2013 |
| CN | 107053849 | A | 8/2017 |
| CN | 107128077 | A | 9/2017 |
| EP | 1604831 | A2 | 12/2005 |

* cited by examiner

RECORDING APPARATUS AND TANK

CROSS-REFERENCE TO RELATED APPLICATIONS

This application is a continuation of U.S. patent application Ser. No. 17/388,612, filed on Jul. 29, 2021. This application claims the benefit of Japanese Patent Application No. 2020-130508, filed Jul. 31, 2020, which is hereby incorporated by reference herein in its entirety.

BACKGROUND

Field of the Disclosure

The present disclosure relates to a recording apparatus that records an image as well as the associated tank for the recording apparatus.

Description of the Related Art

Japanese Patent Application Laid-Open No. 2018-161887 discusses a configuration in which an ink tank can be replenished with ink while gas and liquid are being exchanged between an ink replenishing container and the ink tank. According to the configuration, a plurality of flow channels inserted inside the ink tank via an opening of the ink tank becomes an ink flow channel and an air flow channel. This enables a user to replenish the ink tank with ink without compression of the ink replenishing container.

However, when ink is injected into the ink tank from the ink replenishing container, the configuration discussed in Japanese Patent Application Laid-Open No. 2018-161887 may consume time to determine a flow channel through which ink is to flow and a flow channel through which air is to flow, out of the plurality of flow channels. Such a situation lowers a speed of ink injecting and prolongs time necessary for the ink injecting.

SUMMARY

The present disclosure is directed to a recording apparatus with a shortened time for injecting of a recording material into a tank.

A recording apparatus includes a tank including a chamber configured to store liquid to be supplied to a recording head that ejects the liquid and a filling port from which the liquid is injected into the chamber, and an injection auxiliary member configured to assist injecting of the liquid into the chamber from the filling port, the injection auxiliary member including a first flow channel defined by a first upper end portion that opens toward outside of the tank and a first lower end portion that opens toward inside of the tank and a second flow channel defined by a second upper end portion that opens toward outside of the tank and a second lower end portion that opens toward inside of the tank, wherein the second flow channel has an expansion portion arranged in a middle portion between the second upper end portion and the second lower end portion and configured to form a step to expand a cross-sectional area.

Further features of the present disclosure will become apparent from the following description of exemplary embodiments with reference to the attached drawings.

DESCRIPTION OF THE EMBODIMENTS

Hereinafter, exemplary embodiments are described with reference to the drawings. However, it is to be understood that each of exemplary embodiments described below is not intended to limit the present disclosure, and that not all of combinations of aspects that are described in the following embodiments are necessarily required with respect to an issue to be solved by the present disclosure. In addition, relative arrangements and shapes of components described in each of the exemplary embodiments are illustrative only, and the descriptions of the exemplary embodiments are not intended to limit the scope of the disclosure.

<Apparatus Configuration>

Figure 1:
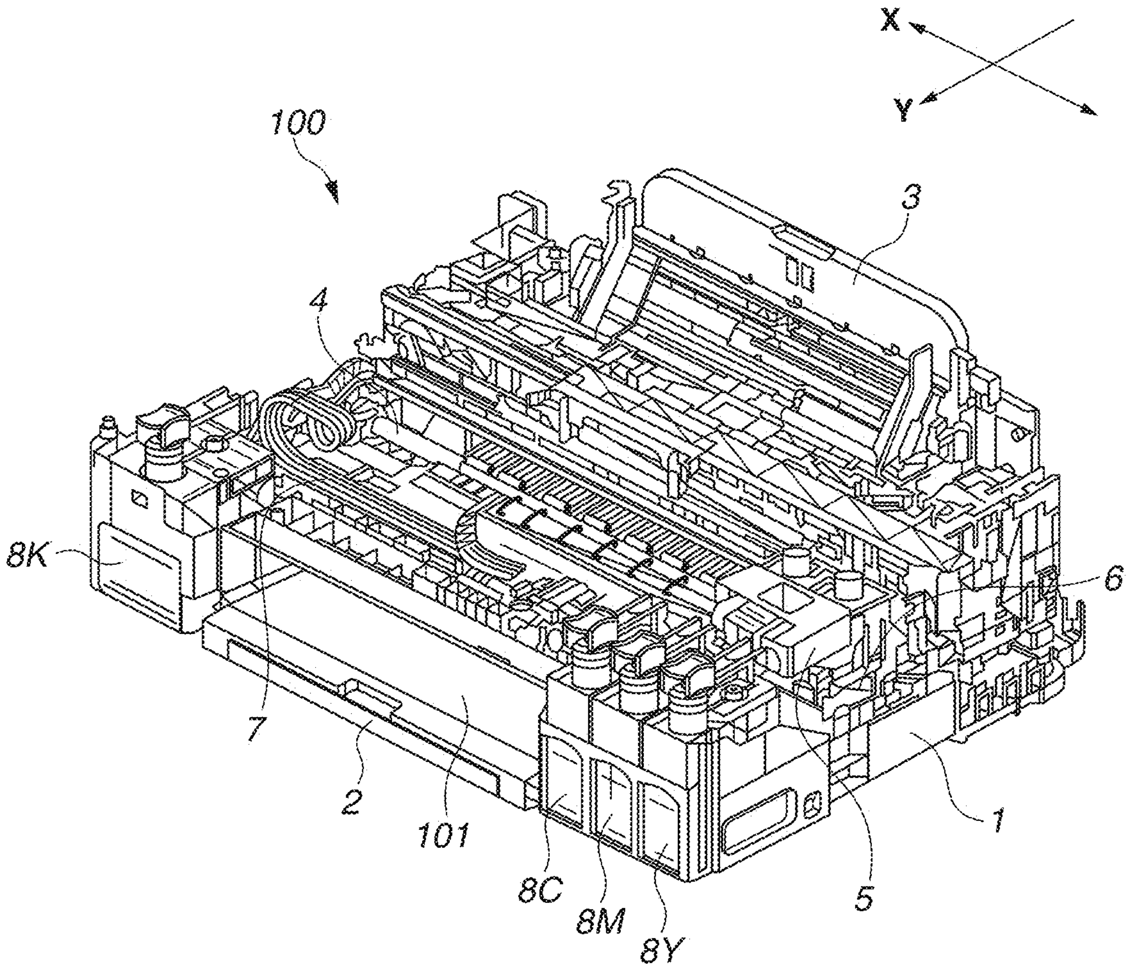
FIG. 1 is a perspective view illustrating an internal configuration of an inkjet recording apparatus according to a first exemplary embodiment.

FIG. 1 is a perspective view illustrating an internal configuration of an inkjet recording apparatus (hereinafter referred to as a recording apparatus) 100 according to the present exemplary embodiment. The recording apparatus 100 includes a casing 1, a recording unit 5 that performs a recording operation on a recording medium, and an ink tank 8 as an ink container in which ink (liquid) to be supplied to the recording unit 5 is stored. In the present exemplary embodiment, the ink tank 8 is disposed at a front side of the casing 1 and fixed to an apparatus body. The recording apparatus 100 includes a cover (not illustrated) that can be opened and closed with respect to the casing 1. In FIG. 1, the cover is opened. The cover can include a scanner unit that can read a document.

The recording apparatus 100 separates recording media, one by one, stacked on a sheet feeding cassette 2 disposed at the front side of the casing 1 or a sheet feeding tray 3 disposed at a back side of the casing 1, and feeds the separated recording medium using a feeding unit (not illustrated). The recording medium fed by the feeding unit is conveyed by a conveyance roller 4 as a conveyance unit to a recording position opposite the recording unit 5, so that the recording unit 5 performs recording based on data. The recording medium on which the recording by the recording unit 5 has been completed is discharged by a discharge portion (not illustrated) to a discharge tray (a discharging unit) 101 disposed on the sheet feeding cassette 2.

A direction (a direction Y in FIG. 1) in which a recording medium is conveyed by the conveyance unit is referred to as a conveyance direction. That is, an upstream side in the conveyance direction corresponds to the back side of the casing 1, whereas a downstream side in the conveyance direction corresponds to the front side of the casing 1.

The recording unit 5 of the present exemplary embodiment includes a recording head including an ejection port from which ink is ejected. The recording unit 5 is mounted on a carriage 6 that reciprocally moves in a main scanning direction (a direction X in FIG. 1) intersecting with the conveyance direction. In the present exemplary embodiment, the conveyance direction is orthogonal to the main scanning direction. The recording unit (the recording head) 5 ejects ink droplets while moving in the main scanning direction together with the carriage 6 to record an image of a predetermined length (one band) on the recording medium (in other words, a recording operation is performed). After the image of one band has been recorded, the recording medium is conveyed for only a predetermined amount by the conveyance unit (in other words, an intermittent conveyance operation is performed). The recording operation for one band and the intermittent conveyance operation are repeated, so that images are recorded across the entire recording medium based on image data.

The recording head in the present exemplary embodiment includes a unit (e.g., a heating resistance element) that generates thermal energy as energy to be used for ink ejection, and employs a method for causing a state of ink to be changed by the thermal energy (film boiling). Accordingly, high-density and high-definition image recording is achieved. The present exemplary embodiment is not limited to employment of such a method using the thermal energy. A method using vibration energy in a configuration including a piezoelectric transducer can be employed.

The present exemplary embodiment is described using an example in which a recording head of the recording unit 5 is a serial head mounted on the carriage 6. However, the present exemplary embodiment is not limited thereto. The present exemplary embodiment can be applied to a line head including a plurality of ejection ports in an area corresponding to a width of a recording medium.

The ink tank 8 is disposed to the recording apparatus 100 for each color of ink ejectable by a recording head of the recording unit 5. In the present exemplary embodiment, a black-ink tank 8K, a cyan-ink tank 8C, a magenta-ink tank 8M, and a yellow-ink tank 8Y are disposed. The ink tanks 8K, 8C, 8M, and 8Y respectively store black ink, cyan ink, magenta ink, and yellow ink. These four ink tanks are collectively called the ink tank 8 or ink tanks 8. Each of the cyan ink, the magenta ink, and the yellow ink is merely one example of color ink, and the color ink is not limited to thereto.

As illustrated in FIG. 1, the black-ink tank 8K is disposed on the left side of the discharge tray 101 and the sheet feeding cassette 2 as viewed from the front of the recording apparatus 100. On the other hand, the cyan-ink tank 8C, the magenta-ink tank 8M, and the yellow-ink tank 8Y are disposed on the right side of the discharge tray 101 and the sheet feeding cassette 2 as viewed from the front of the recording apparatus 100. That is, the discharge tray 101 and the sheet feeding cassette 2 are disposed between the black-ink tank 8*k* and the color-ink tanks 8C, 8M and 8Y. Each of the ink tanks 8 is connected to the recording unit 5 by a flexible supply tube 7 that forms a supply channel for supplying ink to the recording unit 5.

<Configuration of Ink Tank>

Figure 2A:
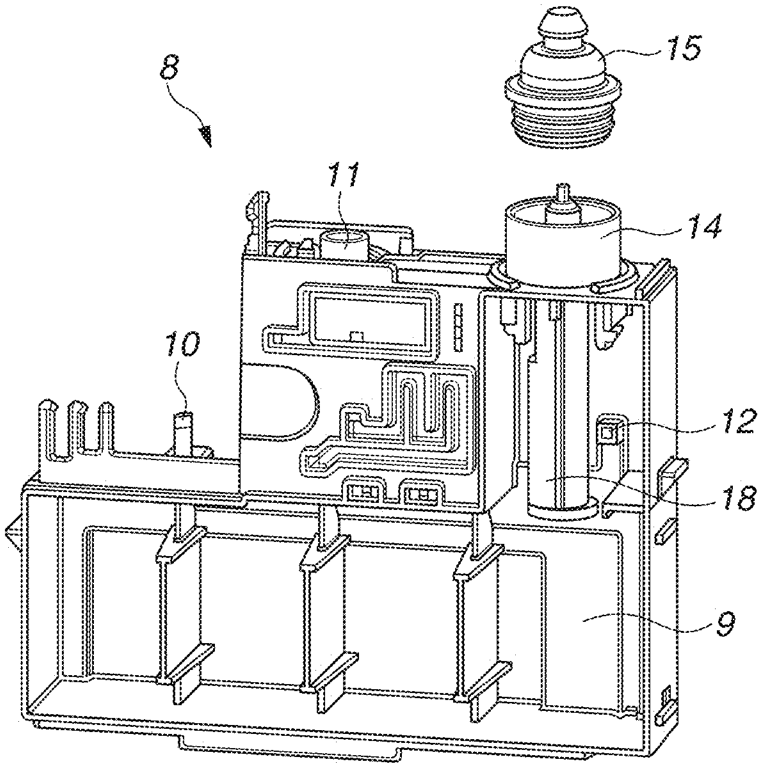
FIGS. 2A and 2B are schematic perspective views each illustrating an ink tank according to the first exemplary embodiment.
Figure 2B:
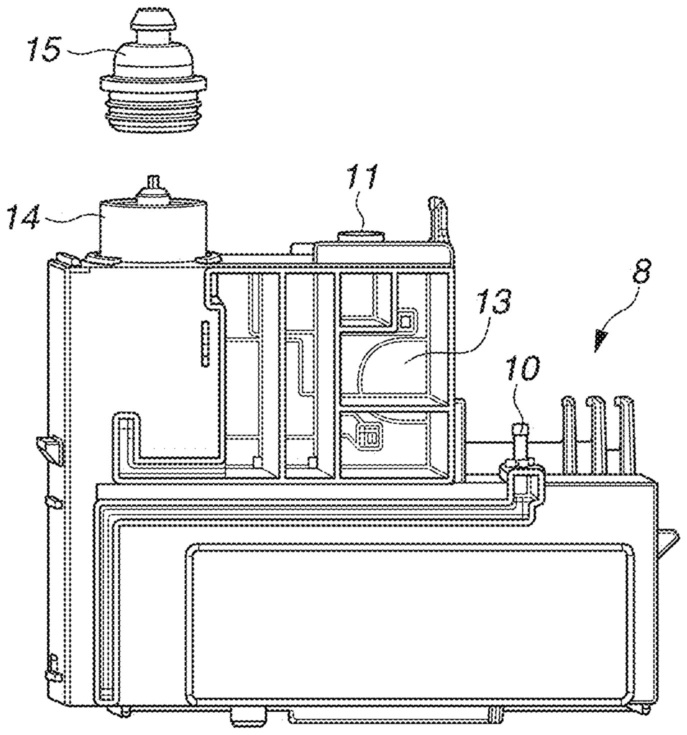

Each of FIGS. 2A and 2B is a schematic diagram of the ink tank 8. The ink tank 8 includes an ink containing chamber 9 in which ink is stored, and an ink supply port 10 to which the supply tube 7 for supplying ink in the ink containing chamber 9 to the recording head is connected. In addition, the ink tank 8 includes an atmosphere introduction port 11 that introduces the atmosphere into the ink containing chamber 9 with consumption of ink inside the ink containing chamber 9. The atmosphere introduction port 11 is connected to a communication port 12 disposed inside the ink containing chamber 9, and an air containing chamber 13 capable of storing air is disposed between the atmosphere introduction port 11 and the communication port 12 (see FIG. 2B). The air containing chamber 13 can also reserve ink that flows backward from the ink containing chamber 9, and such a reservoir function prevents leakage of ink to the outside of the ink tank 8.

FIG. 2A is a perspective view of the ink tank 8 as seen from a first side surface. The ink containing chamber 9 is disposed to open toward the first side surface. FIG. 2B is a perspective view of the ink tank 8 as seen from a second side surface opposite the first side surface. The air containing chamber 13 is disposed to open toward the second side surface. Each of an opening of the ink containing chamber 9 and an opening of the air containing chamber 13 is blocked by a flexible film (not illustrated), so that a storage space is formed.

On an upper surface of the ink tank 8, a filling port 14 as an opening portion for ink injecting is disposed. The filling port 14 can be sealed with a tank cap 15. The tank cap 15 includes a member having rubber elasticity. A user removes the tank cap 15 from the filling port 14, and inserts an ink replenishing container 17 (see FIG. 4) into the filling port 14, so that ink can be injected from the ink replenishing container 17 into the ink tank 8.

<Configuration of Needle>

Figure 3:
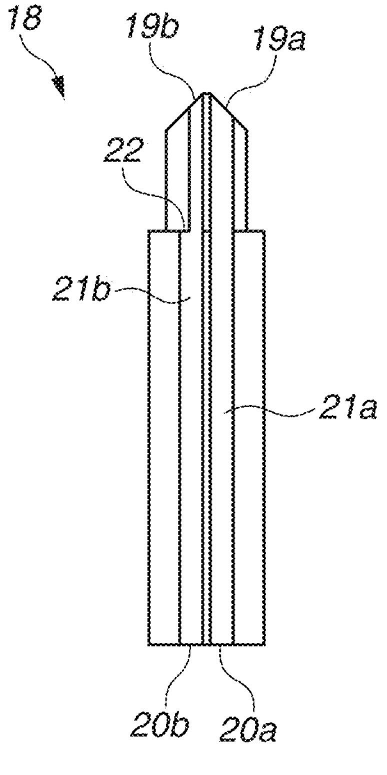
FIG. 3 is a schematic sectional view illustrating a needle according to the first exemplary embodiment.

In the ink tank 8, a needle 18 as an injection auxiliary member that assists injecting of ink from the filling port 14 is provided inside the filling port 14. FIG. 3 is a schematic sectional view of the needle 18.

The needle 18 includes a first flow channel 21*a* and a second flow channel 21*b* to cause the inside and the outside of the ink tank 8 to communicate with each other. The first flow channel 21*a* is defined by a first upper end portion 19*a* and a first lower end portion 20*a*. The first upper end portion 19*a* is exposed upward relative to the top of the filling port 14, and opens toward the outside of the ink tank 8. The first lower end portion 20*a* opens toward the inside of the ink tank 8 (the ink containing chamber 9). Moreover, the second flow channel 21*b* is defined by a second upper end portion 19*b* and a second lower end portion 20*b*. The second upper end portion 19*b* is exposed from the filling port 14, and opens toward the outside of the ink tank 8. The second lower end portion 20*b* opens toward the inside of the ink tank 8 (the ink containing chamber 9).

Each of the first upper end portion 19*a* and the second upper end portion 19*b* is obliquely open with respect to a direction in which the flow channel extends. Each of the first upper end portion 19*a* and the second upper end portion 19*b* has an inclined plane with a height that increases toward a center portion where the first upper end portion 19*a* and the second upper end portion 19*b* are in contact with each other. Moreover, an opening area of the first upper end portion 19*a* is larger than an opening area of the second upper end portion 19*b*. The first flow channel 21*a* is configured such that the opening area of the first upper end portion 19*a*, a cross-sectional area in a middle portion of the first flow channel 21*a*, and an opening area of the first lower end portion 20*a* are substantially equal. In the second flow channel 21*b*, on the other hand, an expansion portion 22 is arranged in a middle portion of the flow channel and configured such that a cross-sectional area between the expansion portion 22 and the second lower end portion 20*b* is larger than an opening area of the second upper end portion 19*b*. That is, the second flow channel 21*b* includes the expansion portion 22 that forms a step that abruptly increases a cross-sectional area in a middle portion of the flow channel.

Figure 4:
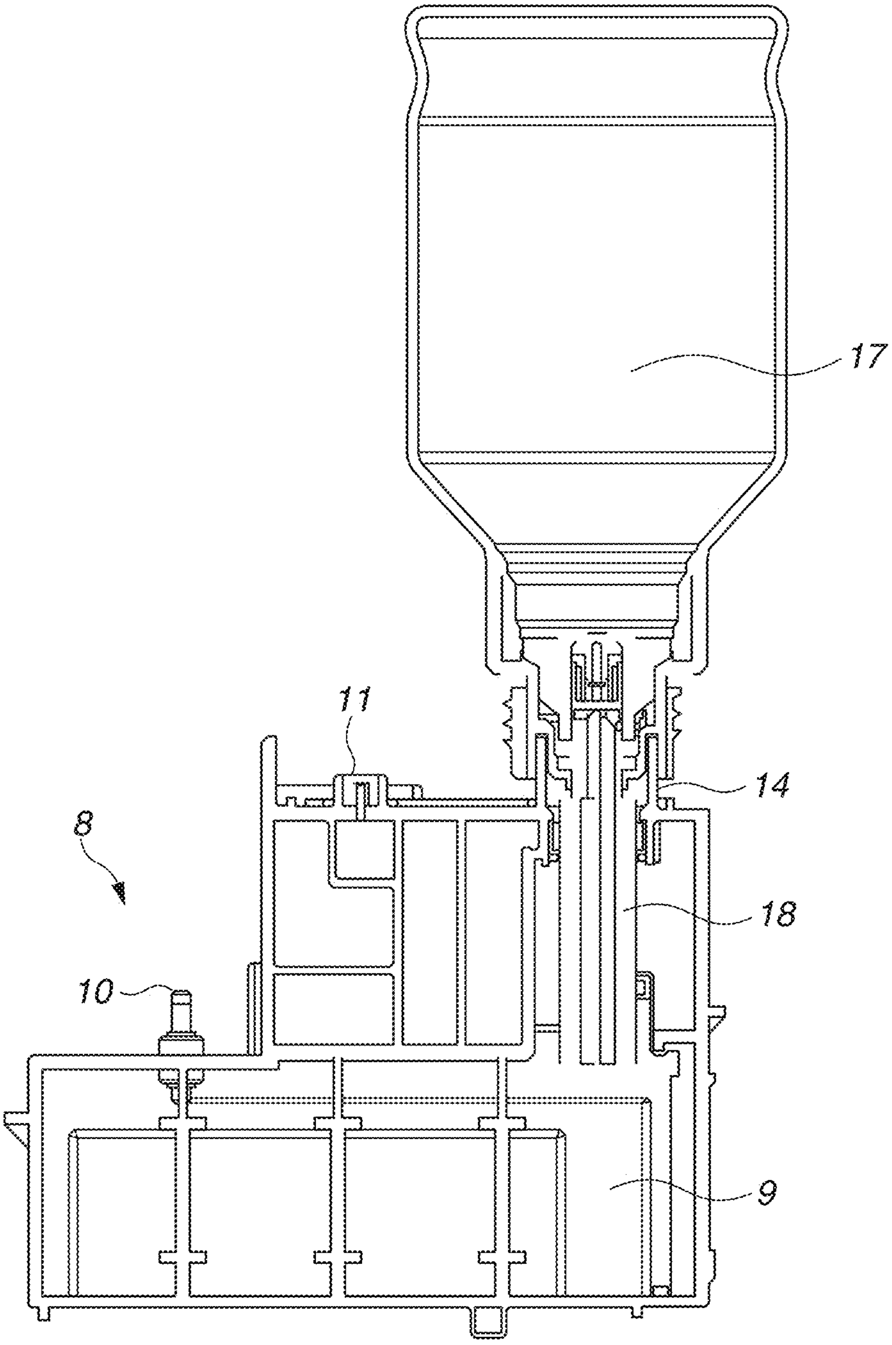
FIG. 4 is a schematic sectional view illustrating a state of an ink injecting operation according to the first exemplary embodiment.
Figure 5:
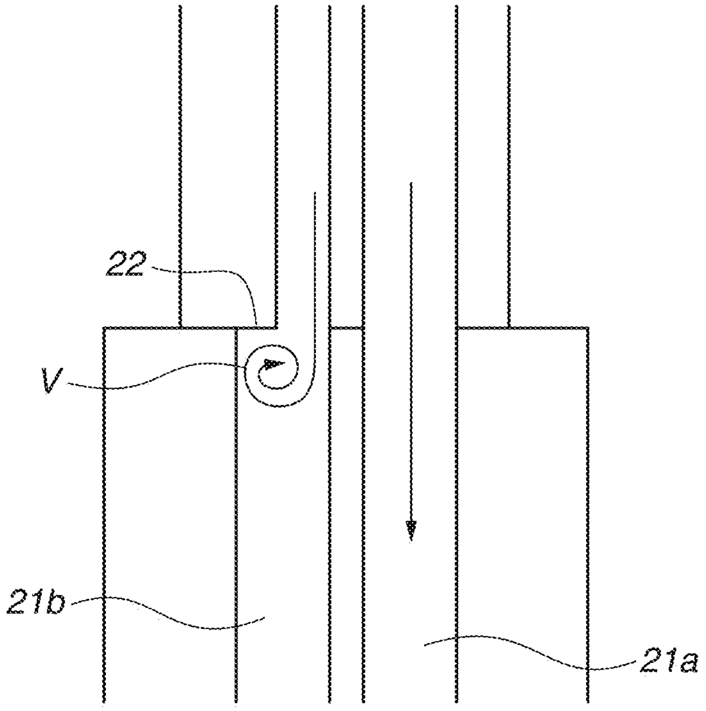
FIG. 5 is an enlarged sectional view schematically illustrating a flow of ink in the needle according to the first exemplary embodiment.

FIG. 4 is a schematic sectional view illustrating a state of an ink injecting operation with the ink replenishing container 17 attached to the filling port 14 of the ink tank 8. FIG. 5 is an enlarged sectional view schematically illustrating a flow of ink in the needle 18 when the ink injecting operation is performed.

In the ink injecting operation, one of the first flow channel 21*a* and the second flow channel 21*b*, which form the needle 18, functions as a flow channel through which ink flows, and the other functions as a flow channel through which air flows. The ink replenishing container 17 has an opening that is closed by a sealing member (not illustrated) such that ink does not drip until the ink replenishing container 17 is inserted into the filling port 14 even if the opening is faced downward.

As illustrated in FIG. 4, in a case where the ink replenishing container 17 is inserted into the filling port 14, the sealing member of the ink replenishing container 17 is opened by the needle 18 (the first upper end portion 19*a* and the second upper end portion 19*b*). Accordingly, ink stored in the ink replenishing container 17 tends to flow into the ink tank 8 via the first flow channel 21*a* and the second flow channel 21*b*.

At this time, as illustrated in FIG. 5, a vortex V is generated in ink flowing through the second flow channel 21*b* at the expansion portion 22 since the expansion portion 22, which forms a step, is arranged in the second flow channel 21*b*. The vortex V causes a pressure loss, and a flow speed of ink in the second flow channel 21*b* is lowered. In the first flow channel 21*a* having a cross-sectional area that is constant from the first upper end portion 19*a* to the first lower end portion 20*a*, a flow of ink is not hindered since a step is not formed in the flow channel. Therefore, a flow speed of ink flowing through the first flow channel 21*a* becomes higher than a flow speed of ink flowing through the second flow channel 21*b*, so that ink stored in the ink replenishing container 17 flows more into the first flow channel 21*a* than the second flow channel 21*b*.

The ink injecting operation according to the present exemplary embodiment is performed using gas-liquid exchange between air and ink. In a case where ink flows into the ink tank 8 from the ink replenishing container 17, an amount of air as much as an amount of ink, which has flowed into the ink tank 8, flows out to the ink replenishing container 17 from the ink tank 8. As described above, since the first flow channel 21*a* becomes to function as an ink inflow channel to the ink tank 8, the air inside the ink tank 8 flows out to the ink replenishing container 17 via the second flow channel 21*b*. Thus, the first flow channel 21*a* is determined as an ink flow channel, whereas the second flow channel 21*b* is determined as an air flow channel.

In a case in which the second flow channel 21*b* has a cross-sectional area that is constant as similar to the first flow channel 21*a*, a difference in ink flow speed (flowability) between the first flow channel 21*a* and the second flow channel 21*b* is not generated. This causes equal amounts of ink to flow to both the first flow channel 21*a* and the second flow channel 21*b*. Consequently, determination of an ink flow channel and an air flow channel requires time. Moreover, in a case where pressure balance occurs due to mixture of ink and air in both of the first flow channel 21*a* and the second flow channel 21*b*, an inflow of ink stops partway and the ink injecting operation may be interrupted.

According to the present exemplary embodiment, on the other hand, an expansion portion, which forms a step in a cross-sectional area of one flow channel, is arranged in one of two flow channels, so that ink flows into the other flow channel more easily. Thus, determination of flow channels is made promptly, and time necessary for the ink injecting operation is shortened.

Moreover, in the present exemplary embodiment, since the opening area of the first upper end portion 19*a* is greater than the opening area of the second upper end portion 19*b*, an amount of ink to flow through the first flow channel 21*a* tends to be greater when the ink replenishing container 17 is attached. Thus, determination of the flow channels in the needle 18 can be more facilitated.

Furthermore, in the ink injecting operation using the gas-liquid exchange, ink should flow into the ink tank 8 from the ink replenishing container 17 as an amount of air having flowed out to the ink replenishing container 17 from the ink tank 8 is large. Accordingly, an outflow of air into the ink replenishing container 17 should be facilitated and an inflow of ink into the ink tank 8 should also be smoothly performed as air is easily separated from the needle 18 by becoming a bubble.

In the present exemplary embodiment, the first upper end portion 19*a* and the second upper end portion 19*b* each have an inclined plane. With such planes, air is separated from the needle 18 more easily, and an outflow of air into the ink replenishing container 17 is facilitated. Details are described with reference to FIGS. 6A through 6D and 7A through 7D. In FIGS. 6A through 6D and 7A through 7D, although the description is given using an example of a fourth exemplary embodiment that is described below and has a configuration in which a height of a first upper end portion 19*a* is greater than a height of a second upper end portion 19*b*, a similar phenomenon occurs even in the configuration according to the first exemplary embodiment.

Each of FIGS. 6A through 6D is a comparative example in which each of the first upper end portion 19*a* and the second upper end portion 19*b* does not have an inclined plane. Each of FIGS. 7A through 7D is a schematic diagram illustrating the first upper end portion 19*a* and the second upper end portion 19*b* each having an inclined plane according to the present exemplary embodiment. Air flows out to the ink replenishing container 17 from the second flow channel 21*b* by following the respective flows illustrated in FIGS. 6A through 6D and 7A through 7D. Not only an air bubble needs to be formed but also the bubble needs to be separated from the second upper end portion 19*b* as illustrated in FIGS. 6A through 6D and 7A through 7D to cause air to flow out from the second upper end portion 19*b* toward the ink replenishing container 17 in which ink is stored.

Figure 6A:
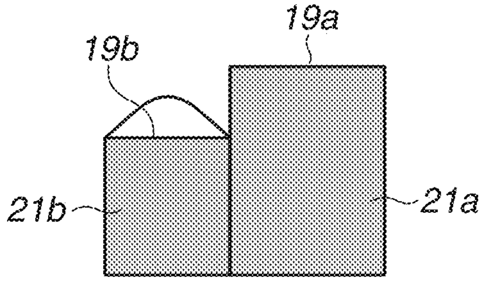
FIGS. 6A, 6B, 6C, and 6D are sectional views each illustrating a comparative example in which an inclined plane is not formed on an upper end portion of the needle.
Figure 6B:
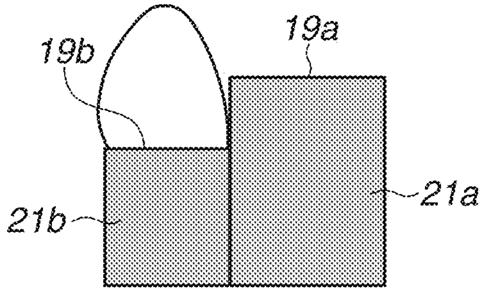
Figure 6C:
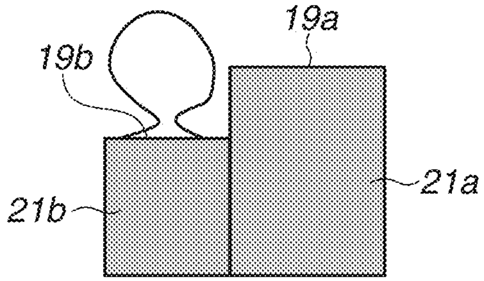
Figure 6D:
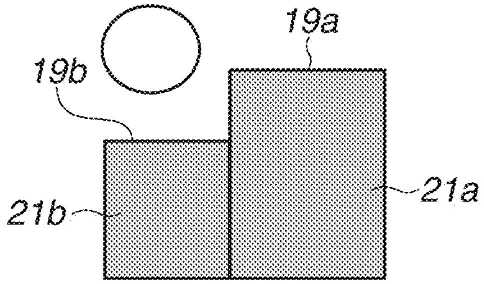

In a case where an inclined plane is not formed as described in the comparative example illustrated in FIGS. 6A through 6D, a bubble needs to be separated from an entire opening plane of the second upper end portion 19*b* at the time of transition from a state in FIG. 6B to a state in FIG. 6C. This consumes time. That is, a bubble is in plane-contact with the second upper end portion 19*b*, and a contact area is large. Consequently, the bubble does not tend to be separated.

Figure 7A:
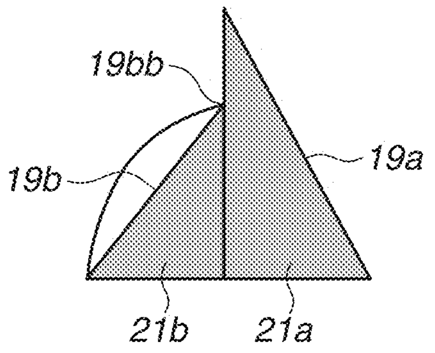
FIGS. 7A, 7B, 7C, and 7D are sectional views each schematically illustrating an upper end portion of the needle according to the first exemplary embodiment.
Figure 7B:
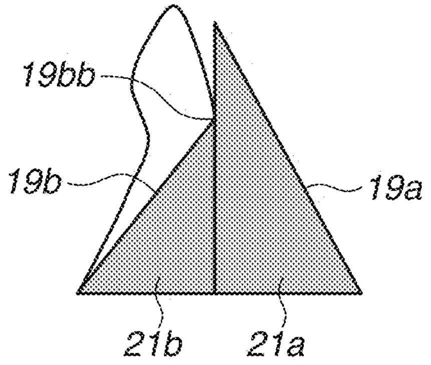
Figure 7C:
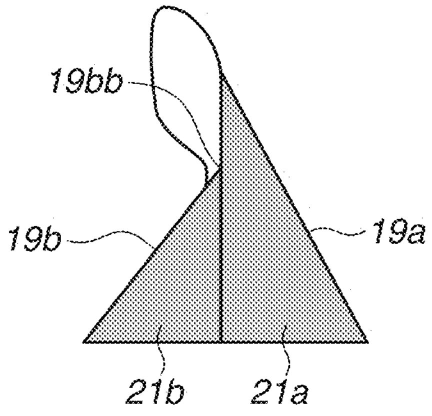
Figure 7D:
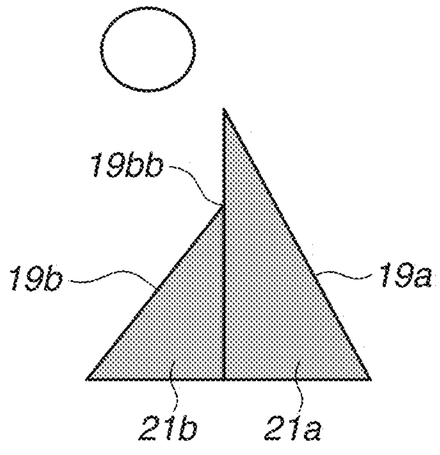

On the other hand, in a case where an inclined plane is formed as described in the present exemplary embodiment illustrated in FIGS. 7A through 7D, a bubble is separated from a top portion 19*bb* of the second upper end portion 19*b* at the time of transition from a state in FIG. 7B to a state in FIG. 7C. Thus, the bubble is readily formed. That is, a bubble is in line-contact with the top portion 19*bb*, and a contact area is smaller than a contact area in the case illustrated in FIGS. 6A through 6D. Thus, the bubble is separated more easily. Therefore, air smoothly flows out to the ink replenishing container 17 from the ink tank 8, so that a speed at which ink flows into the ink tank 8 from the ink replenishing container 17 is also enhanced. In addition, a height of the inclined plane is formed to be greater toward a portion where the first upper end portion 19*a* and the second upper end portion 19*b* are in contact with each other. With such a configuration, the bubble rises while contacting a side surface of the first upper end portion 19*a*, and thus the bubble is separated even more easily (see FIG. 7C).

Even if heights of the first upper end portion 19*a* and the second upper end portion 19*b* do not differ as described in the first exemplary embodiment, an upward movement of a bubble is facilitated since the second upper end portion 19*b* is obliquely open with respect to the bubble to move upward. Therefore, a contact area of the second upper end portion 19*b* can be reduced more relative to the comparative examples illustrated in FIGS. 6A through 6D.

As described above, in the needle 18 as an injection auxiliary member including a plurality of flow channels, one flow channel has an expansion portion that forms a step to expand a cross-sectional area, and the other flow channel does not have a step. Accordingly, an ink flow speed in the one flow channel having the expansion portion becomes lower, whereas an ink flow speed in the other flow channel becomes relatively higher. Thus, an inflow of ink to the ink tank 8 via the other flow channel having no step is facilitated. In the ink injecting operation by gas-liquid exchange, an inflow of air to the one flow channel having a step is facilitated since an amount of air as much as an amount of ink having flowed into the ink tank 8 needs to flow out to the ink replenishing container 17. Accordingly, a flow channel through which ink is to flow and a flow channel through which air is to flow are determined quicker than a case in which the one flow channel does not have an expansion portion (a step), and thus an ink injecting time can be shortened.

The present exemplary embodiment has been described using a configuration in which the ink tank 8 is fixed to the recording apparatus 100 and ink is supplied to a recording head by the supply tube 7. However, the present exemplary embodiment is not limited to such a configuration. The present exemplary embodiment can be applied to a configuration in which both an ink tank and a recording head are mounted on the carriage 6. That is, a filling port and a needle can be arranged in an ink tank to be mounted on a carriage 6. In such a configuration, a user injects ink from an ink replenishing container.

Hereinafter, a second exemplary embodiment is described with reference to the drawings. Since a basic configuration of the present exemplary embodiment is similar to that of the first exemplary embodiment, only a distinctive configuration is described below.

Figure 8:
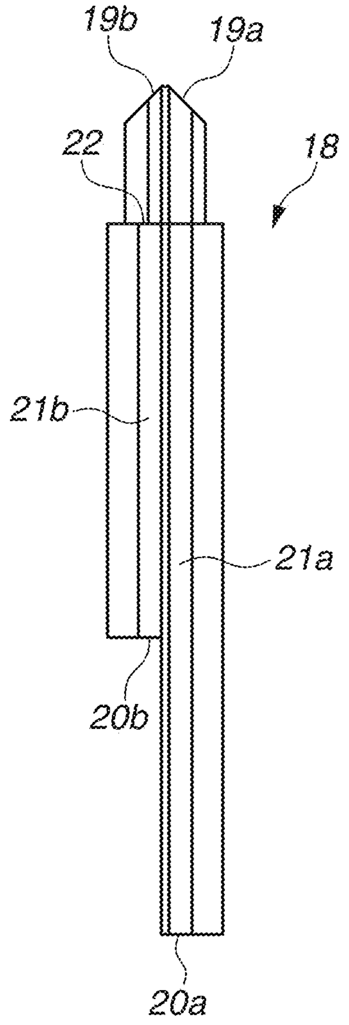
FIG. 8 is a schematic sectional view illustrating a needle according to a second exemplary embodiment.

FIG. 8 is a schematic sectional view of a needle 18 according to the second exemplary embodiment. In the second exemplary embodiment, the first flow channel 21*a* is formed to be longer than the second flow channel 21*b* such that the first lower end portion 20*a* of the first flow channel 21*a* protrudes downward relative to the second lower end portion 20*b* of the second flow channel 21*b*. That is, in a state in which the needle 18 is attached to the filling port 14, the second lower end portion 20*b* is in a position higher than a position of the first lower end portion 20*a* in a direction of gravity.

Figure 9:
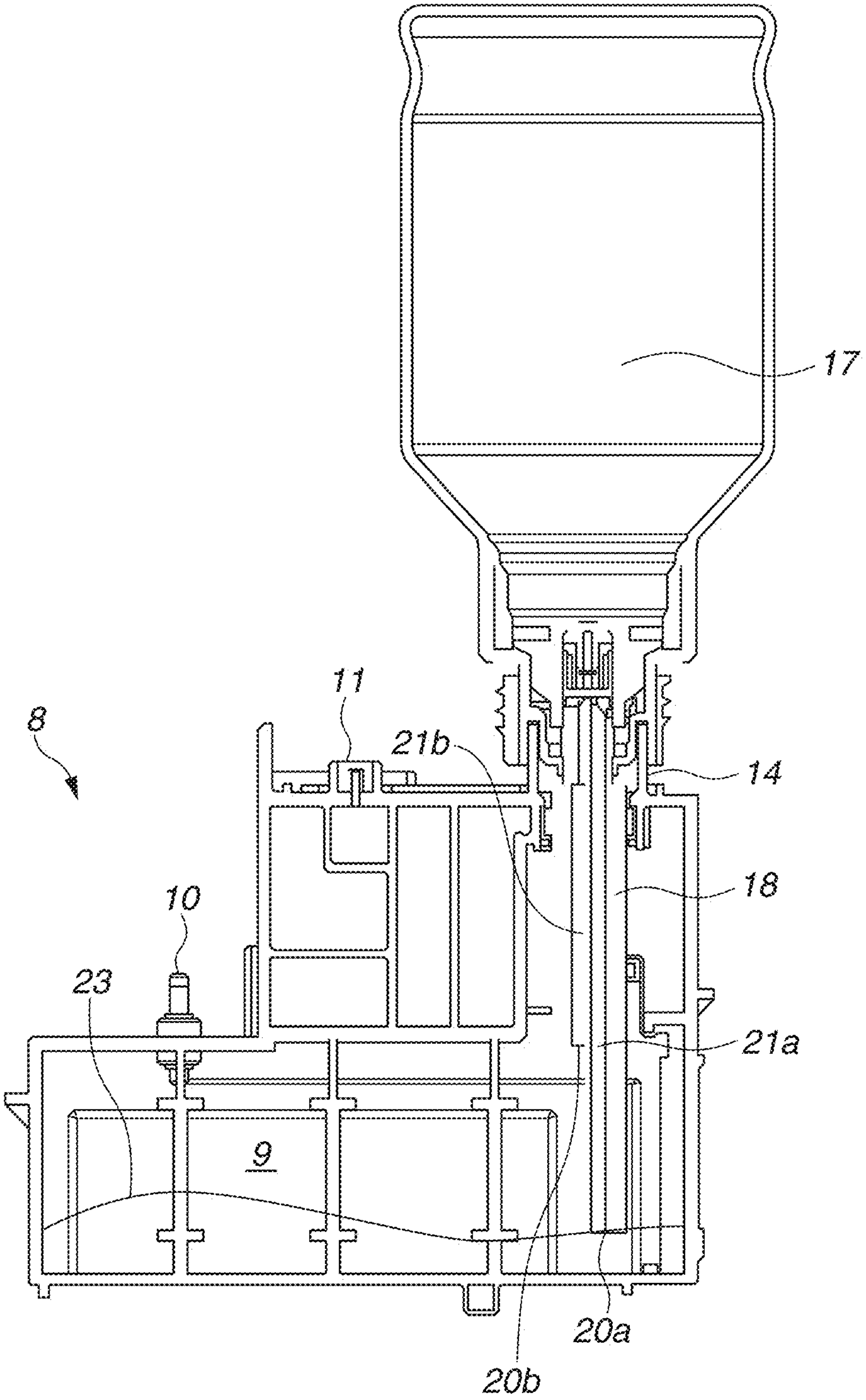
FIG. 9 is a schematic sectional view illustrating a state of an ink injecting operation according to the second exemplary embodiment.

FIG. 9 is a schematic sectional view of the ink injecting operation using the needle 18 according to the second exemplary embodiment. FIG. 9 illustrates a state in which a liquid surface 23 of ink that has injected into the ink tank 8 reaches the first lower end portion 20*a*. Since the first flow channel 21*a* is longer than the second flow channel 21*b*, a distance between the first lower end portion 20*a* and a bottom surface of the ink tank 8 (an ink containing chamber 9) is shorter than a distance between the second lower end portion 20*b* and the bottom surface of the ink tank 8 (the ink containing chamber 9).

When ink injecting progresses and the liquid surface 23 in the ink tank 8 (the ink containing chamber 9) reaches the first lower end portion 20*a*, the first lower end portion 20*a* is blocked by ink. Consequently, air in the ink tank 8 becomes unable to flow out to the ink replenishing container 17 via the first lower end portion 20*a* (the first flow channel 21*a*). Thus, the first flow channel 21*a* is determined to function as an ink flow channel, and the second flow channel 21*b* is determined to function as an air flow channel.

Accordingly, a reduction in distance between the first lower end portion 20*a* of the first flow channel 21*a* functioning as an ink flow channel and the bottom surface of the ink tank 8 (the ink containing chamber 9) enables flow channel determination to be further facilitated, and time necessary for the ink injecting operation can be shortened.

Hereinafter, a third exemplary embodiment is described with reference to the drawings. Since a basic configuration of the present exemplary embodiment is similar to that of the first exemplary embodiment, only a distinctive configuration is described below.

Figure 10:
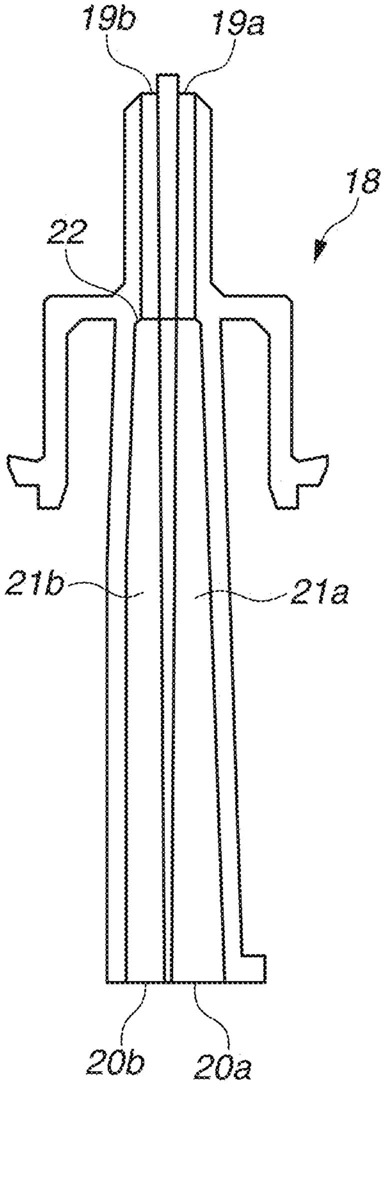
FIG. 10 is a schematic sectional view illustrating a needle according to a third exemplary embodiment.

FIG. 10 is a schematic sectional view illustrating the needle 18 according to the third exemplary embodiment. In the third exemplary embodiment, a cross-sectional area of the first flow channel 21*a* has a tapered shape to become larger toward the first lower end portion 20*a*. The first flow channel 21*a* has a smooth surface thereinside, and does not have roughness or a step such as the expansion portion 22 in the second flow channel 21*b*. Accordingly, such a smooth flow-channel shape where the cross-sectional area is expanded toward the first lower end portion 20*a* from the first upper end portion 19*a* can further enhance an ink flow speed in the first flow channel 21*a*.

Hereinafter, a fourth exemplary embodiment is described with reference to the drawings. Since a basic configuration of the present exemplary embodiment is similar to that of the first exemplary embodiment, only a distinctive configuration is described below.

Figure 11:
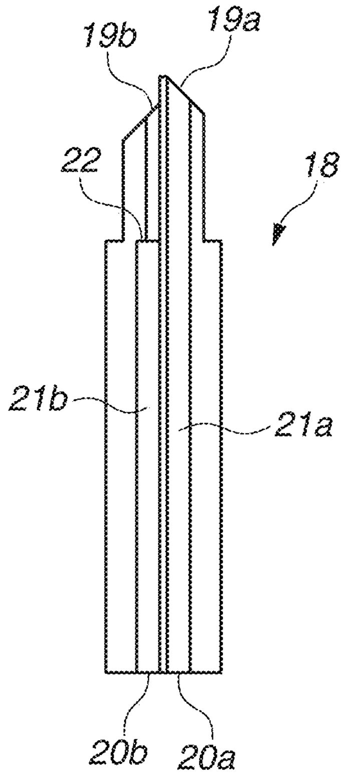
FIG. 11 is a schematic sectional view illustrating a needle according to a fourth exemplary embodiment.

FIG. 11 is a schematic sectional view illustrating a needle 18 according to the fourth exemplary embodiment. In the fourth exemplary embodiment, the first upper end portion 19*a* of the first flow channel 21*a* is formed to be tall in the direction of gravity to protrude upward relative to the second upper end portion 19*b* of the second flow channel 21*b*.

Since the first upper end portion 19*a* protrudes upward relative to the second upper end portion 19*b*, the first upper end portion 19*a* contacts ink stored in the ink replenishing container 17 before the second upper end portion 19*b* contacts the ink when the needle 18 is inserted into the ink replenishing container 17 for the ink injecting operation. Such a configuration enables ink to flow though the first flow channel 21*a* more easily, and flow channel determination is further facilitated.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A liquid ejecting apparatus comprising:

a tank including a first chamber configured to store liquid to be supplied to an ejecting head;

a first channel defined by a first upper end portion that opens toward outside of the first chamber and a first lower end portion that opens toward inside of the first chamber; and a second channel defined by a second upper end portion that opens toward outside of the first chamber and a second lower end portion that opens toward inside of the first chamber, the second upper end portion being obliquely open, wherein the second channel includes a step configured within the second channel to expand a cross-sectional area of the second channel.

2. The liquid ejecting apparatus according to claim 1, wherein the first upper end portion is obliquely open.

3. The liquid ejecting apparatus according to claim 1, wherein the first upper end portion has an opening area that is larger than an opening area of the second upper end portion.

4. The liquid ejecting apparatus according to claim 1, wherein the step is formed closer to the second upper end portion than the second lower end portion.

5. The liquid ejecting apparatus according to claim 1, wherein the first upper end portion and the second upper end portion are capped by a tank cap.

6. The liquid ejecting apparatus according to claim 1, wherein the tank includes a second chamber configured to store air.

7. The liquid ejecting apparatus according to claim 6, wherein the second chamber is provided above the first chamber.

8. The liquid ejecting apparatus according to claim 6, wherein the tank includes an opening configured to introduce air into the second chamber.

9. A liquid ejecting apparatus comprising:

a tank including a chamber configured to store liquid to be supplied to an ejecting head;

a first channel defined by a first upper end portion that opens toward outside of the chamber and a first lower end portion that opens toward inside of the chamber, the first upper end portion being obliquely open; and a second channel defined by a second upper end portion that opens toward outside of the chamber and a second lower end portion that opens toward inside of the chamber, wherein the second channel includes a step configured within the second channel to expand a cross-sectional area of the second channel.

10. A liquid ejecting apparatus comprising:

a tank including a first chamber configured to store liquid to be supplied to an ejecting head;

a first channel defined by a first upper end portion that opens toward outside of the first chamber and a first lower end portion that opens toward inside the first chamber; and a second channel defined by a second upper end portion that opens toward outside of the first chamber and a second lower end portion that opens toward inside the first chamber, wherein the second channel includes a step configured within the second channel to expand a cross-sectional area of the second channel, the step being formed closer to the second upper end portion than the second lower end portion.

11. The liquid ejecting apparatus according to claim 10, wherein the first upper end portion has an opening area that is larger than an opening area of the second upper end portion.

12. The liquid ejecting apparatus according to claim 10, wherein the first upper end portion and the second upper end portion are capped by a tank cap.

13. The liquid ejecting apparatus according to claim 10, wherein the tank includes a second chamber configured to store air.

14. The liquid ejecting apparatus according to claim 13, wherein the second chamber is provided above the first chamber.

15. The liquid ejecting apparatus according to claim 13, wherein the tank includes an opening configured to introduce air into the second chamber.

* * * * *